March 1, 1966   P. R. ROWLAND   3,237,297
COLD-WELDING METHODS
Filed March 21, 1960
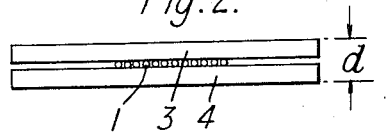
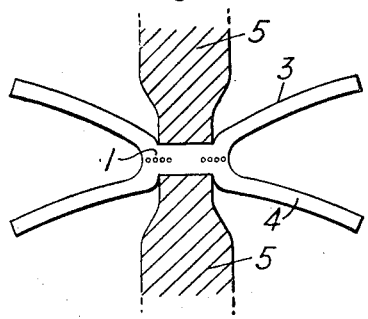
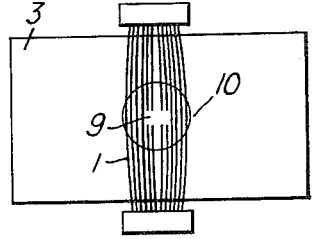
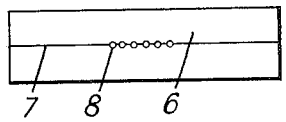
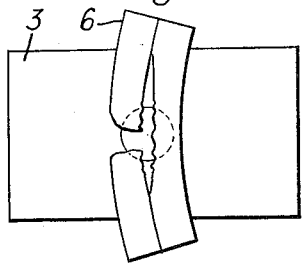
Inventor
Peter R. Rowland
By
*Attorney*

3,237,297
COLD-WELDING METHODS
Peter R. Rowland, Parkstone, Poole, Dorset, England, assignor to AMP Incorporated, Harrisburg, Pa.
Filed Mar. 21, 1960, Ser. No. 16,265
Claims priority, application Great Britain, Mar. 23, 1959, 9,956/59
3 Claims. (Cl. 29—470.1)

It is known to join two pieces of similar metals by pressing them together under high pressure, and without the application of heat or electric current, in order to effect cold pressure-welding of the two pieces where the pressure is applied. The process has been applied to the joining of various metals, such as aluminum and copper and their alloys, but in order to achieve a good cold pressure-weld the surfaces to be joined must be scratch-brushed or given some equivalent treatment after being degreased.

I have now found that I can obtain a good cold pressure-weld without any prior surface treatment, such as scratch-brushing, other than degreasing and I have therefore fulfilled my major object which was to simplify the cold pressure-welding of metals. My other objects in making this invention will be apparent from what follows.

According to my invention a third component is placed between the two metal pieces to be joined and the pieces pressed together. Under the applied welding pressure the third component produces a scraping, scouring or breaking action on the surfaces to be cold pressure-welded together. By interposing the third component between the two pieces, the surfaces of the pieces and component in contact being free of grease, and then pressing the two pieces together so that the third component produces a scraping, scouring or breaking action on the surfaces of the pieces, cold pressure-welding takes place in the area scraped, scoured or broken.

The third component may be a grid or mesh of wires, preferably of harder material than the metal of the pieces to be joined, but is preferably a metal shim which breaks under the applied pressure; the shim may be perforated or provided with a line of lines of weakness to assist the breakage.

In order that the invention may be more clearly understood, various cold pressure-welding methods will now be described with reference to the accompanying drawings. These drawings and experiments are referred to merely for purposes of illustration and exemplification and I do not intend to be limited by them; the scope of my invention is to be determined solely from a consideration of the appended claims and in the light of the prior art.

FIGURE 1 is a view of one form of third component comprising an assembly of closely packed parallel wires;

FIGURE 2 is a section through two metal pieces and the third component of FIGURE 1 when assembled and prior to pressing;

FIGURE 3 is a similar section after cold pressure-welding;

FIGURE 4 is a view of the weld area after the metal pieces have been pulled apart;

FIGURE 5 is a view of another form of the third component comprising a perforated shim; and FIGURE 6 is a view of the weld area, after pulling the pieces apart, when using the shim of FIGURE 5.

The first series of methods, which will be described in conjection with FIGURES 1 to 4, consisted in squeezing two aluminum plates between hardened steel punches with a third component, consisting of a grid made from piano wire, positioned between the plates. The plates were sheared from commercially pure aluminum rolled sheet which had a highly polished appearance and was about 1/8" thick.

The piano wire grids were made as shown in FIGURE 1, by taking about two dozen wires 1 of 0.015" diameter and laying them side-by-side to lie snugly against each other, and then securing them at their ends by brass clips 2.

A grid was laid between two aluminum plates 3 and 4, as shown in FIGURE 2, in the region to be deformed and the two plates were squeezed together between 3/8" diameter hardened steel punches 5, as shown in FIGURE 3, so that the reduction in thickness produced by this indentation process was about 60% (that is from 0.25" to 0.10"). The force required to pull the plates apart was then measured.

During the process of deformation the wires of the grid were spread apart so that the final section was somewhat as shown in FIGURE 3. When the metal pieces were pulled apart it was found that the wires were broken in a central region 9 of the deformed area 10 lying between the punches (FIGURE 4); the weld was most firmly established within the central region 9.

Each weld was compared with "control" welds prepared at the same time but without the third component. Three welds were made at each test as follows:

(a) *Control I.*—The plates were thoroughly degreased.

(b) *Control II.*—The plates were thoroughly degreased and then scratch-brushed.

(c) *Test piece.*—The plates were degreased and deformed with a grid therebetween. The grid was also degreased.

Degreasing was effected by immersion in three successive beakers of pure carbon tetrachloride. The batch of plates for each test (i.e. six plates in all) and the piano wire grid were degreased in the same baths and the three welds were made and tested within as short a time of each other as possible. The following table indicates the pull-off values in pounds for six tests, A, B, C, D, E and F. The amount of deformation, that is the reduction in thickness of the deformed metal as a percentage of the total original thickness, is given in each case.

Table 1

| Test | Control I | | Control II | | Test pieces | |
|---|---|---|---|---|---|---|
|  | Pull-off, lbs. | Deformation, percent | Pull-off, lbs. | Deformation, percent | Pull-off, lbs. | Deformation, percent |
| A | .50 | 58 | 110 | 52 | 120 | 51 |
| B | 55 | 56 | 165 | 65 | 215 | 54 |
| C | 45 | 55 | 300 | 58 | 200 | 57 |
| D | 35 | 58 | 200 | 58 | 215 | 56 |
| E | 50 | 58 | 260 | 58 | 305 | 50 |
| F | 75 | 58 | 190 | 58 | 220 | 49 |

Full allowance for the thickness of the wires was made in calculating the above deformations; the dimension *d* in FIGURE 2 was taken as the original thickness.

The figures show that the test pieces had an adhesion comparable to that obtained with scratch-brushed surfaces and considerably greater than that obtained with surfaces given no treatment. That true cold pressure-welding took place was confirmed by examination of the samples after pulling apart. As with the scratch-brushed specimens, the weld occurred over a small central region of the deformed area; in many cases, on pulling the plates apart, one carried with it a plug pulled out of the other, indicating an adhesion comparable with that of solid metal.

A second series of cold pressure-welding methods was carried out using a steel shim as the third component. These methods will be described with reference to FIGURES 5 and 6. The steel shim 6, as shown in FIGURE 5, was weakened by scratching a line 7 along the centre of the shim. The shim was also pierced with an engineer's scriber to form perforations 8 at about 0.04" intervals along the length of the line 7.

Table II shows the pull-off values in pounds for a series of tests G, H, I, J, K, L, using different thicknesses of shim. As before, degreasing of the plates and the shim was carried out. The table also shows the results obtained with "control" tests carried out on plates scratch-brushed after degreasing but using no shim.

*Table II*

| Test | Control | | Test piece | | |
|---|---|---|---|---|---|
| | Pull-off, lbs. | Deformation, percent | Thickness of shim, inches | Deformation, percent | Pull-off, lbs. |
| G | 146 | 59 | 0.010 | 57 | 418 |
| H | 180 | 59 | 0.010 | 58 | 384 |
| I | 184 | 59 | 0.005 | 55 | 436 |
| J | 220 | 59 | 0.020 | 54 | 440 |
| K | | | 0.015 | 53 | 406 |
| L | | | 0.020 | 54 | 390 |

In test L the aluminum plates were also scratch-brushed.

The cold pressure welding causing the shims to break along the scratched and perforated lines 7, the main weld again taking place in the centre of the deformed area.

Shims without perforations or weakening scratch lines can also be used provided that the shim breaks under the applied welding pressure, as was shown by using steel spring 0.0045" thick as the third component with aluminum plates ⅛" thick. It was found that with this combination the maximum pull-off values were obtained at a deformation of 53%; above and below this figure the pull-off values were lower. In a series of give samples cold-welded at this deformation pull-off values of 370, 360 and 360 lbs. were obtained in three cases in which the plates bent but did not actually separate. In the other two cases pulling the plates apart caused one plate to pull a plug of metal out of the other and in this case pull-off values of 450 and 425 lbs. were measured.

The thicker the plates being welded the greater must be the deformation brought about during welding. For example, to obtain a measurable pull-off value of 50 lbs. ⅛" plates must be deformed by 25%, 3/16" plates must be deformed by 35% and ¼" plates by 40%. The reason for this is that the shim forming the third component does not break so quickly with the thicker plates. In fact I believe that welding takes place immediately the shim breaks and that further pressure must be applied to increase the contact area between the plates.

Other experiments have shown that in lieu of a grid made of piano wire, a grid made of anodised aluminum wires produced some improvement in the weld over Control I. "Hollander Weave" mesh made of Monel metal, as well as perforated mild steel sheets, also improved the weld over Control I. Shims made of brass can also be used, and a closely packed array of small steel ball bearings, about 1/16 or 1/32 inch diameter, used as the third component also improved the weld over Control I The invention can be applied to the crimping of the aluminum ferrule of an electrical connector or terminal onto an aluminum conductor to cold pressure-weld the ferrule and conductor together to make a good electrical connection. In applying the invention to such crimping, a closely wound coil of steel wire may be positioned between the ferrule barrel and the conductor.

I claim:

1. A method of cold pressure welding two aluminum surfaces comprising the steps of degreasing the surfaces, interposing a fracturable metal shim between said surfaces, pressing said surfaces together until said shim fractures and is extruded from between said surfaces, and continuing pressing said surfaces together until said surfaces are cold pressure welded.

2. A method as set forth in claim 1 wherein said shim has scratch lines on its surface to facilitate fracturing.

3. A method as set forth in claim 1 wherein said shim has scratch lines on its surface and has perforations extending therethrough on said scratch lines to facilitate fracturing.

References Cited by the Examiner

UNITED STATES PATENTS

| | | |
|---|---|---|
| 405,057 | 6/1889 | Taylor. |
| 517,223 | 3/1894 | Lee. |
| 517,580 | 4/1894 | Livingston. |
| 1,936,185 | 11/1933 | Brenizer _____ 29—459 XR |
| 2,038,535 | 4/1936 | Brenizer _____ 29—459 |
| 2,078,473 | 4/1937 | Truemper. |
| 2,169,937 | 8/1939 | Wempe. |
| 2,522,408 | 9/1950 | Sowter _____ 29—470.1 |
| 2,560,411 | 7/1951 | Burns _____ 29—459 |
| 2,763,057 | 9/1956 | Clair _____ 29—470.1 |
| 3,020,454 | 2/1962 | Dixon _____ 29—470.1 XR |

FOREIGN PATENTS 678,610  9/1952  Great Britain.

OTHER REFERENCES

German printed application D16,645, August 30, 1956.

JOHN F. CAMPBELL, *Primary Examiner.*

WHITMORE A. WILTZ, *Examiner.*